United States Patent
Yamanaka et al.

(10) Patent No.: US 10,725,476 B2
(45) Date of Patent: Jul. 28, 2020

(54) UNMANNED OPERATION VEHICLE

(71) Applicant: HONDA MOTOR CO., LTD., Tokyo (JP)

(72) Inventors: Makoto Yamanaka, Wako (JP); Yoshihisa Hirose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 16/109,933

(22) Filed: Aug. 23, 2018

(65) Prior Publication Data
US 2018/0364729 A1 Dec. 20, 2018

Related U.S. Application Data

(63) Continuation of application No. PCT/JP2016/058554, filed on Mar. 17, 2016.

(51) Int. Cl.
| | | |
|---|---|---|
| *G05D 1/02* | (2020.01) | |
| *A01D 34/00* | (2006.01) | |
| *A01D 34/64* | (2006.01) | |
| *A01B 69/00* | (2006.01) | |
| *A01D 101/00* | (2006.01) | |

(52) U.S. Cl.
CPC ......... *G05D 1/0231* (2013.01); *A01D 34/008* (2013.01); *A01D 34/64* (2013.01); *G05D 1/0246* (2013.01); *A01B 69/001* (2013.01); *A01D 2101/00* (2013.01); *G05D 2201/0208* (2013.01)

(58) Field of Classification Search
CPC ............... G05D 1/0231; G05D 1/0246; G05D 2201/0208; A01D 34/008; A01D 34/64; A01D 2101/00; A01B 69/001

USPC .......................................................... 701/23
See application file for complete search history.

(56) References Cited

U.S. PATENT DOCUMENTS
2015/0012163 A1    1/2015  Crawley

FOREIGN PATENT DOCUMENTS

| EP | 2286653 A2 | 2/2011 |
|---|---|---|
| EP | 2515196 A2 | 10/2012 |
| EP | 3187953 A1 | 7/2017 |
| GB | 2500214 A | 9/2013 |
| JP | H08-57159 A * | 3/1996 |
| JP | H08-057159 A | 3/1996 |
| JP | H09-167017 A * | 6/1997 |
| JP | H10-034570 A | 2/1998 |
| JP | 2008-015692 A | 1/2008 |

(Continued)

OTHER PUBLICATIONS

European Search Report issued for European Patent Application No. 16894415.5 dated Jan. 30, 2019.

(Continued)

*Primary Examiner* — Brian P Sweeney
(74) *Attorney, Agent, or Firm* — Thomas | Horstemeyer, LLP

(57) ABSTRACT

An unmanned operation vehicle includes a housing, a wheel provided in the housing, and an operation unit provided under the housing. The housing includes a plurality of cameras configured to capture an image of an outside of the unmanned operation vehicle. The plurality of cameras are arranged substantially at a center of an upper surface of the housing in a plan view. The housing may include a single camera unit including the plurality of cameras.

7 Claims, 4 Drawing Sheets

(56) References Cited

FOREIGN PATENT DOCUMENTS

| | | |
|---|---|---|
| JP | 2009-301175 A | 12/2009 |
| JP | 2013-061852 A | 4/2013 |
| WO | 2015144202 A1 | 10/2015 |
| WO | 2017/158797 A1 | 9/2017 |

OTHER PUBLICATIONS

International Search Report dated May 31, 2016, in International Application No. PCT/JP2016/058554.

* cited by examiner

UNMANNED OPERATION VEHICLE

This application is a continuation of International Patent Application No. PCT/JP2016/058554 filed on Mar. 17, 2016, the entire content of which is incorporated herein by reference.

TECHNICAL FIELD

The present invention relates to an unmanned operation vehicle. The present invention particularly relates to an unmanned operation vehicle including a plurality of cameras and capable of capturing an image of an outside.

BACKGROUND ART

There is conventionally proposed an unmanned operation vehicle that is equipped with an operation device such as a lawn mowing blade and actuates the operation device while traveling in a set operation area without humans in attendance. For example, European Patent No. 2286653 discloses an unmanned operation vehicle with a camera at an edge portion of its housing.

The unmanned operation vehicle disclosed in European Patent No. 2286653 can capture an image of the lower side of the edge portion of the housing of the unmanned operation vehicle by the camera and determine whether the operation area included in the imaging range has already undergone the operation or not. The unmanned operation vehicle disclosed in European Patent No. 2286653 can determine, for example, whether a lawn mowing operation has already been done for the operation area included in the imaging range.

The present inventors recognized that the camera is also usable for another application purpose of, for example, determining the presence/absence of an obstacle around the unmanned operation vehicle. The present inventors recognized that if the purpose is to capture the image of the periphery of the unmanned operation vehicle, only capturing the image of the lower side of the edge portion of the housing of the unmanned operation vehicle, like the unmanned operation vehicle disclosed in European Patent No. 2286653, is insufficient. The present inventors recognized that the unmanned operation vehicle disclosed in European Patent No. 2286653 has room for improvement to arrange the camera at a suitable position.

SUMMARY OF INVENTION

An aspect of the present invention provides an unmanned operation vehicle capable of arranging a plurality of cameras at suitable positions. Other aspects of the present invention will be apparent to those skilled in the art by referring to the aspects and preferred embodiments to be described below and the accompanying drawings.

The first aspect according to the present invention is directed to an unmanned operation vehicle comprising a housing, a self-propelled wheel provided in the housing, and an operation unit provided under the housing, wherein the housing includes a plurality of cameras configured to capture an image of an outside of the unmanned operation vehicle, and the plurality of cameras are arranged substantially at a center of an upper surface of the housing in a plan view.

According to the first aspect, as compared to a case in which, for example, the plurality of cameras are arranged at positions far from the substantially center of the upper surface of the housing in the plan view, it is possible to reduce the blind spots of the imaging ranges of the cameras without changing the number of cameras, the arrangement positions of the cameras, and the angles of view of the cameras.

According to the second aspect of the present invention, in the first aspect, the housing may comprise a single camera unit including the plurality of cameras.

When the plurality of cameras are integrated in the single camera unit, the process and operation time for the housing to individually mount the plurality of camera on the housing is unnecessary.

According to the third aspect of the present invention, in the first or second aspect, the upper surface of the housing may be highest substantially at the center of the upper surface of the housing in the plan view.

When the upper surface of the housing is highest substantially at the center of the upper surface in the plan view, inclusion of part of the upper surface of the housing in an image captured by each camera is suppressed.

According to the fourth aspect of the present invention, in the first to third aspects, an outer periphery of the housing is formed into a substantially rectangular shape formed by a front edge, a rear edge, a left edge, and a right edge in the plan view, and the plurality of cameras may comprise four cameras including a front camera configured to capture an image on a front side of the unmanned operation vehicle, a rear camera configured to capture an image on a rear side of the unmanned operation vehicle, a left camera configured to capture an image on a left side of the unmanned operation vehicle, and a right camera configured to capture an image on a right side of the unmanned operation vehicle.

According to the fourth aspect, as compared to a case in which the outer periphery of the housing has, for example, an almost perfect circle shape in the plan view, the blind spots of the imaging ranges of the cameras can be reduced without changing the angles of view of the plurality of cameras provided in the camera unit.

According to the fifth aspect of the present invention, in the fourth aspect, when the unmanned operation vehicle is viewed from an upper side, a distance from the front edge of the housing to the camera unit may be longer than a distance from the rear edge of the housing to the camera unit.

According to the fifth aspect, as compared to a case in which, for example, the distance from the front edge of the outer periphery of the housing to the camera unit is shorter than the distance from the rear edge of the outer periphery to the camera unit, the blind spots of the imaging ranges of the cameras can be reduced without changing the angles of view of the front camera, the left camera, and the right camera provided in the camera unit.

According to the sixth aspect of the present invention, in the first to fifth aspects, in at least a front half of the housing, when the plurality of cameras are viewed from the upper side, cameras adjacent to each other in the plurality of cameras may be arranged such that limiting lines of imaging ranges of the cameras intersect on or inside the outer periphery of the housing.

According to the sixth aspect, the blind spots of the imaging ranges of the cameras are eliminated at least on the front side with respect to the center of the upper surface of the housing, and the camera unit can suitably acquire information outside the unmanned operation vehicle.

According to the seventh aspect of the present invention, in the sixth aspect, not only in the front half of the housing but also in a rear half, when the camera unit is viewed from the upper side, cameras adjacent to each other in the plurality of cameras may be arranged such that limiting lines of imaging ranges of the cameras intersect on or inside the outer periphery of the housing.

According to the seventh aspect, the blind spots of the imaging ranges of the cameras are eliminated on the rear side with respect to the center of the upper surface of the housing as well, and the camera unit can suitably acquire information outside the unmanned operation vehicle.

DESCRIPTION OF EMBODIMENTS

Preferred embodiments to be described below are used to easily understand the present invention. Hence, those skilled in the art should remember that the present invention is not improperly limited by the embodiments to be explained below.

Figure 1:
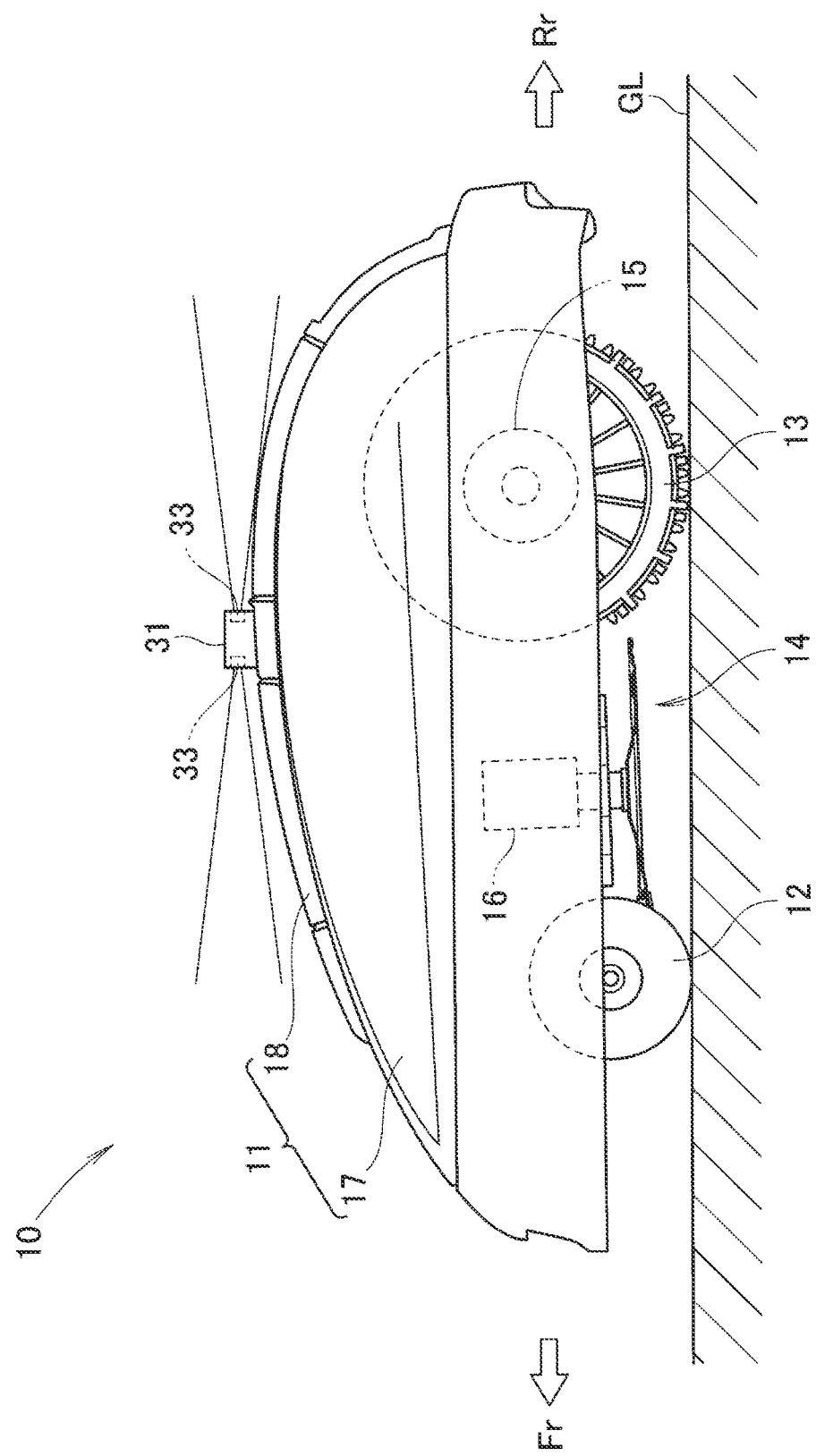
FIG. 1 is a side view of an unmanned operation vehicle according to the present invention.
Figure 2:
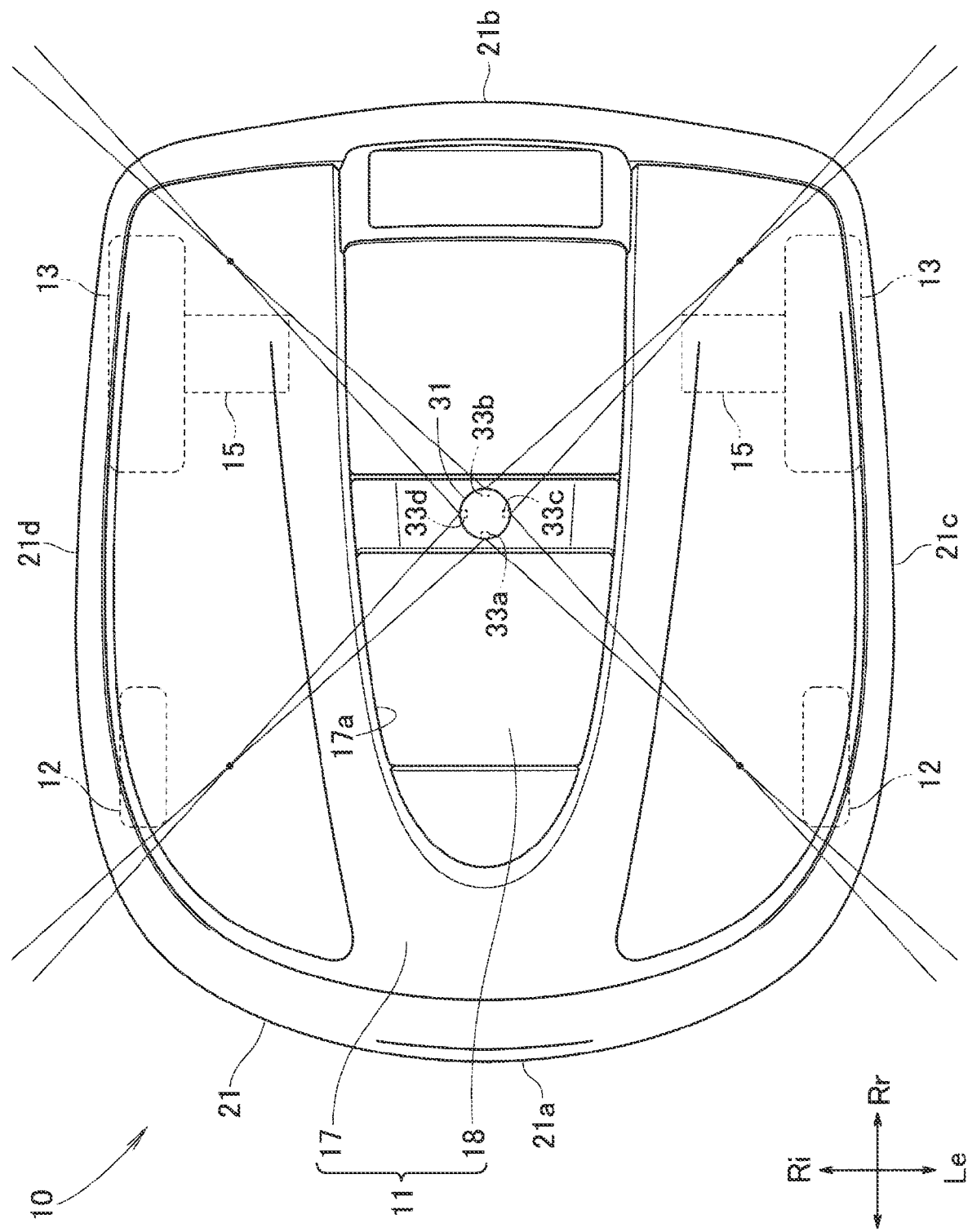
FIG. 2 is a plan view of the unmanned operation vehicle shown in FIG. 1.

As an example of an unmanned operation vehicle (to be referred to as an operation vehicle hereinafter) 10, FIGS. 1 and 2 show an unmanned lawn mower (so-called robot lawn mower) capable of autonomously traveling to mow a lawn. The operation vehicle 10 includes a housing 11, left and right front wheels 12 provided on the front side of the housing 11, left and right rear wheels 13 provided on the rear side of the housing 11, and an operation unit 14 provided on the lower side at the center of the housing 11. In the example shown in FIGS. 1 and 2, the lawn mowing blade 14 of the robot lawn mower 10 is shown as an example of the operation unit 14.

The housing 11 also serves as a bodywork. The housing 11 may include a main body portion 17, and a lid portion 18 configured to open/close an opening portion 17a provided substantially at the center of the main body portion 17 in the plan view. Alternatively, the housing 11 need not include the lid portion 18. An outer periphery 21 of the main body portion 17 of the housing 11 is formed into a substantially rectangular shape formed by a front edge 21a, a rear edge 21b, a left edge 21c, and a right edge 21d in the plan view.

The lid portion 18 may have one end configured to engage with the end of the main body portion 17 on the side of the opening portion 17a, thereby vertically pivot about the engaging portion and opening/closing the opening portion 17a of the main body portion 17. Alternatively, the lid portion 18 may be configured to be detachable from the main body portion 17, thereby opening/closing the opening portion 17a of the main body portion 17.

The left and right rear wheels 13 are individually driven by left and right drive motors 15. The operation unit 14 is driven by an operation unit drive motor 16. The left and right drive motors 15 and the operation unit drive motor 16 are a kind of power sources mounted in the housing 11.

The operation vehicle 10 also includes a control unit (not shown) that automatically controls the left and right drive motors 15 and the operation unit drive motor 16 based on detection signals from various kinds of detection sensors (not shown) and/or an image captured by a camera unit 31 (to be described later). The various kinds of detection sensors (not shown) are, for example, an obstacle detection sensor, an angular velocity sensor, and an acceleration sensor. When the left and right drive motors 15 rotate forward with the same speed or rotate backward with the same speed, the operation vehicle 10 drives straight ahead in the front-and-rear direction. When only one of the left and right drive motors 15 rotates backward, the operation vehicle 10 turns.

The housing 11 has one camera unit 31 that includes a plurality of cameras 33 capable of capturing an image of the outside of the operation vehicle 10 and is arranged substantially at the center of the upper surface of the housing 11 in the plan view. If the housing 11 includes the lid portion 18, the camera unit 31 is arranged substantially at the center of the upper surface of the lid portion 18 in the plan view. If the housing 11 includes the lid portion 18, the camera unit 31 arranged on the lid portion 18 can be removed only by removing the lid portion 18. That is, the user need not individually remove the camera unit 31 using, for example, a screwdriver in an exchange or inspection.

Figure 3:
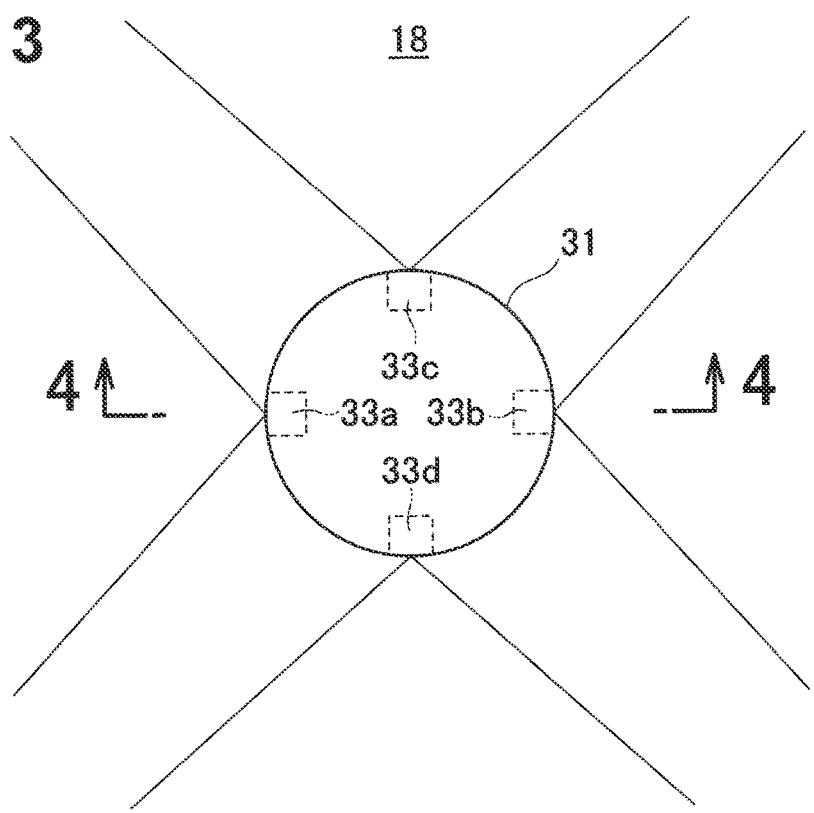
FIG. 3 is an enlarged view of the central portion of the housing of the unmanned operation vehicle shown in FIG. 2.
Figure 3:
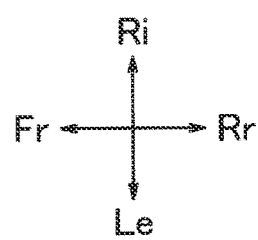

The reason why it is suitable to arrange the camera unit 31 substantially at the center of the upper surface of the housing 11 in the plan view will be described here. The camera unit 31 has the plurality of cameras 33 on the outer periphery of the camera unit 31. In the example shown in FIGS. 2 and 3, the camera unit 31 includes four cameras 33, that is, a front camera 33a that captures an image on the front side of the operation vehicle 10, a rear camera 33b that captures an image on the rear side of the operation vehicle 10, a left camera 33c that captures an image on the left side of the operation vehicle 10, and a right camera 33d that captures an image on the right side of the operation vehicle 10. In the example shown in FIGS. 2 and 3, the limiting lines of the imaging ranges of the cameras 33, which schematically represent the angles of view of the cameras 33, extend from the cameras 33 so as to facilitate an explanation of blind spots of the imaging ranges, that is, portions outside the imaging ranges of the cameras 33 provided in the camera unit 31.

Figure 5:
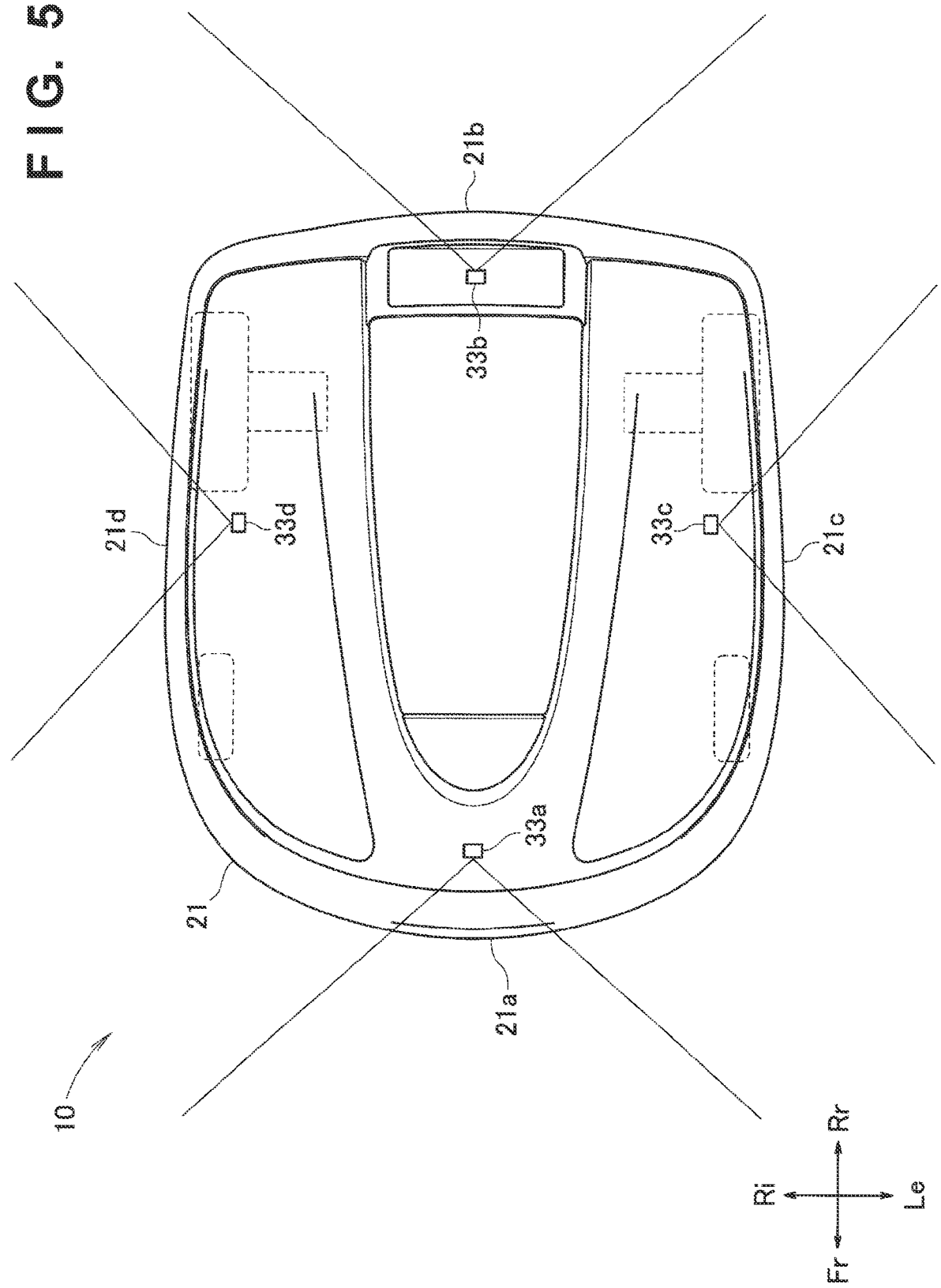
FIG. 5 is a plan view of a modification of the unmanned operation vehicle shown in FIG. 1.

FIG. 5 shows a comparative example in which the plurality of cameras 33 are directly arranged on the housing 11 without being integrated in the camera unit 31. That is, in the comparative example shown in FIG. 5, the front camera 33a is arranged on a side close to the front edge 21a of the main body portion 17 of the housing 11. The rear camera 33b is arranged on a side close to the rear edge 21b of the main body portion 17. The left camera 33c is arranged on a side close to the left edge 21a of the main body portion 17. The right camera 33d is arranged on a side close to the right edge 21d of the main body portion 17. The angle of view of each camera 33 in the comparative example shown in FIG. 5 is substantially the same as the angle of view of each camera 33 in the example shown in FIG. 2.

When FIGS. 2 and 5 are compared, the blind spots of the imaging ranges of the cameras 33 are smaller in the example shown in FIG. 2. That is, when the cameras 33 are arranged substantially at the center of the upper surface of the housing 11 in the plan view, the blind spots of the imaging ranges of the cameras 33 can be reduced without changing the number of cameras 33, the arrangement positions of the cameras 33, and the angles of view of the cameras 33, as compared to a case in which the cameras 33 are arranged at positions far from the substantially center of the upper surface of the housing 11 in the plan view.

As described above, on the housing 11, the suitable position to arrange the camera unit 31 is substantially at the center of the upper surface of the housing 11 in the plan view.

Figure 4:
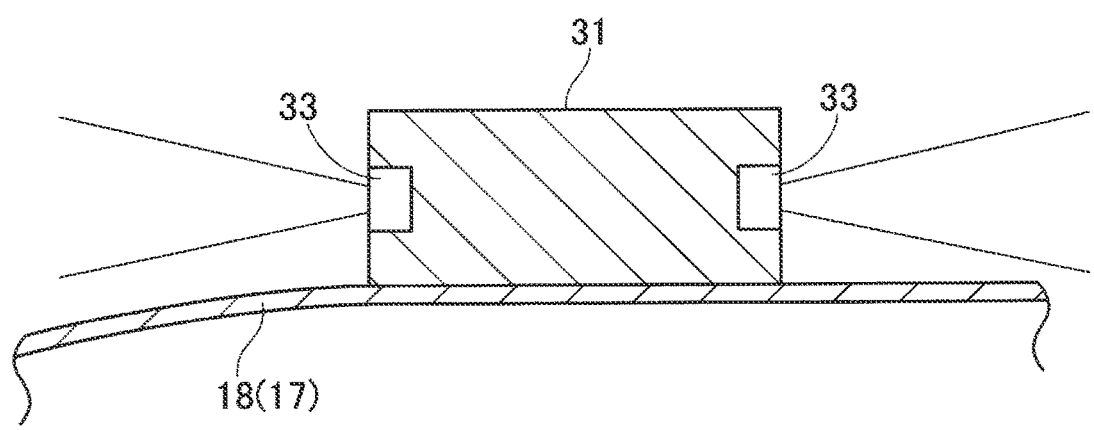
FIG. 4 is a sectional view taken along a line 4-4 in FIG. 3.

Additionally, as shown in FIGS. 1 and 4, the housing 11 is preferably formed such that the upper surface of the housing 11 becomes highest substantially at the center in the plan view. Since the upper surface of the housing 11 is highest substantially at the center of the upper surface in the plan view, inclusion of part of the upper surface of the housing 11 in an image captured by each camera 33 is suppressed.

As in the example shown in FIG. 2, in at least the front half of the upper surface of the housing 11, the limiting lines of the imaging ranges of the cameras 33 adjacent to each other in the camera unit 31 viewed from the upper side preferably intersect on or inside the outer periphery 21 of the housing 11. That is, in order to implement this, the number of cameras 33, the arrangement positions of the cameras 33 on the camera unit 31, and the angles of view of the cameras 33 are preferably appropriately selected. As a result, the blind spots of the imaging ranges of the cameras 33 are eliminated at least on the front side with respect to the center of the upper surface of the housing 11, and the camera unit 31 can suitably acquire information outside the operation vehicle 10.

Additionally, as in the example shown in FIG. 2, in at least the rear half of the upper surface of the housing 11, the limiting lines of the imaging ranges of the cameras 33 adjacent to each other in the camera unit 31 viewed from the upper side preferably intersect on or inside the outer periphery 21 of the housing 11. That is, in order to implement this, the number of cameras 33, the arrangement positions of the cameras 33 on the camera unit 31, and the angles of view of the cameras 33 are preferably appropriately selected. As a result, the blind spots of the imaging ranges of the cameras 33 are eliminated on the rear side with respect to the center of the upper surface of the housing 11 as well, and the camera unit 31 can suitably acquire information outside the operation vehicle 10.

Since the outer periphery 21 of the main body portion 17 of the housing 11 is formed into a substantially rectangular shape in the plan view, the distances from the left and right corners of the outer periphery 21 on the front and rear sides to the camera unit 31 are longer than the distances from the front edge 21a, the rear edge 21b, the left edge 21c, and the right edge 21d of the outer periphery 21 to the camera unit 31. For this reason, as compared to a case in which the outer periphery 21 has, for example, a substantially perfect circle shape in the plan view, the blind spots of the imaging ranges of the cameras 33 can be reduced without changing the angles of view of the cameras 33 (the front camera 33a, the rear camera 33b, the left camera 33c, and the right camera 33d) provided in the camera unit 31 in the example shown in FIG. 2.

In the example shown in FIG. 2, the distance from the front edge 21a of the outer periphery 21 of the main body portion 17 of the housing 11 to the camera unit 31 is longer than the distance from the rear edge 21b of the outer periphery 21 to the camera unit 31. That is, the distances from the left and right corners of the outer periphery 21 on the front side (the corner between the front edge 21a and the left edge 21c and the corner between the front edge 21a and the right edge 21d) to the camera unit 31 are longer than the distances from the left and right corners on the rear side (the corner between the rear edge 21b and the left edge 21c and the corner between the rear edge 21b and the right edge 21d) to the camera unit 31. For this reason, as compared to a case in which, for example, the distance from the front edge 21a of the outer periphery 21 of the main body portion 17 of the housing 11 to the camera unit 31 is shorter than the distance from the rear edge 21b of the outer periphery 21 to the camera unit 31, the blind spots of the imaging ranges of the cameras 33 can be reduced without changing the angles of view of the front camera 33a, the left camera 33c, and the right camera 33d provided in the camera unit 31 in the example shown in FIG. 2.

In the embodiment described above, the camera unit 31 including the plurality of cameras 33 is arranged on the housing 11. According to some embodiments, the plurality of cameras 33 may directly be arranged on the housing 11 without being integrated in the camera unit 31. In this case, the camera unit 31 is replaced with the plurality of cameras 33 as needed in the above-described embodiment. Note that in a case in which the plurality of cameras 33 are integrated in the single camera unit 31, the process and operation time for the housing 11 to individually mount the plurality of camera 33 on the housing 11 is unnecessary.

The present invention is not limited to the above-described exemplary embodiments, and those skilled in the art can easily change the above-described exemplary embodiments within the range included in the scope of the appended claims.

INDUSTRIAL APPLICABILITY

The operation vehicle 10 according to the present invention can suitably be employed as an unmanned operation vehicle capable of autonomously traveling.

The invention claimed is:

1. An unmanned operation vehicle comprising a housing, a self-propelled wheel provided in the housing, and an operation unit provided under the housing,
    wherein the housing includes a plurality of cameras configured to capture an image of an outside of the unmanned operation vehicle, and
    the plurality of cameras are arranged substantially at a center of an upper surface of the housing in a plan view, and
    when the plurality of cameras are viewed from the upper side, cameras adjacent to each other in the plurality of cameras are arranged such that limiting lines of imaging ranges of the cameras intersect on or inside the outer periphery of the housing.

2. The unmanned operation vehicle according to claim 1, wherein the housing comprises a single camera unit including the plurality of cameras.

3. The unmanned operation vehicle according to claim 1, wherein the upper surface of the housing is highest substantially at the center of the upper surface of the housing in the plan view.

4. The unmanned operation vehicle according to claim 1, wherein an outer periphery of the housing is formed into a substantially rectangular shape formed by a front edge, a rear edge, a left edge, and a right edge in the plan view, and
    the plurality of cameras comprise four cameras including a front camera configured to capture an image on a front side of the unmanned operation vehicle, a rear camera configured to capture an image on a rear side of the unmanned operation vehicle, a left camera configured to capture an image on a left side of the unmanned operation vehicle, and a right camera configured to capture an image on a right side of the unmanned operation vehicle.

5. The unmanned operation vehicle according to claim 4, wherein when the unmanned operation vehicle is viewed from an upper side, a distance from the front edge of the housing to the camera unit is longer than a distance from the rear edge of the housing to the camera unit.

6. The unmanned operation vehicle according to claim 1, wherein in at least a front half of the housing, when the plurality of cameras are viewed from the upper side, cameras adjacent to each other in the plurality of cameras are arranged such that limiting lines of imaging ranges of the cameras intersect on or inside, the outer periphery of the housing.

7. The unmanned operation vehicle according to claim 6, wherein not only in the front half of the housing but also in a rear half, when the camera unit is viewed from the upper side, cameras adjacent to each other in the plurality of cameras are arranged such that limiting lines of imaging ranges of the cameras intersect on or inside the outer periphery of the housing.

\* \* \* \* \*